US007370317B2

(12) United States Patent
Cabrera et al.

(10) Patent No.: US 7,370,317 B2
(45) Date of Patent: May 6, 2008

(54) AUTOMATED GENERATION OF MESSAGE EXCHANGE PATTERN SIMULATION CODE

(75) Inventors: Luis Felipe Cabrera, Bellevue, WA (US); George P. Copeland, Redmond, WA (US); Jason Allen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 729 days.

(21) Appl. No.: 10/763,311

(22) Filed: Jan. 23, 2004

(65) Prior Publication Data

US 2005/0166186 A1    Jul. 28, 2005

(51) Int. Cl.
*G06F 9/44* (2006.01)

(52) U.S. Cl. ............... 717/105; 702/122; 702/108; 702/182; 709/206; 709/224; 705/1; 719/328

(58) Field of Classification Search ............ None
See application file for complete search history.

(56) References Cited

U.S. PATENT DOCUMENTS

| 5,557,798 | A | 9/1996 | Skeen et al. ............ 395/650 |
| 6,920,410 | B2* | 7/2005 | Southam et al. ......... 702/122 |
| 2002/0116466 | A1* | 8/2002 | Trevithick et al. ...... 709/206 |
| 2004/0117199 | A1* | 6/2004 | Fremantle et al. ........ 705/1 |
| 2005/0080608 | A1 | 4/2005 | Burns et al. ............ 703/22 |
| 2005/0198148 | A1 | 9/2005 | Cabrera et al. ......... 709/206 |

FOREIGN PATENT DOCUMENTS

EP    1 452 969    1/2004

OTHER PUBLICATIONS

Efficient Message Dispatch in Object-Oriented Systems, Mayur Naik and Rejeev Kumar, Mar. 2000, p. 49-58, ACM SIGPLAN.
Cybernetics and Systems-Towards a Unified Messaging Environment Over the Internet, Leonard Chong, Siu Cheung Hui and Chai Kiat Yeo, 1999, p. 533-549.
ECOOP '95 Object-Oriented Programming Message Dispatch on Pipelined Processors, Karel Driesen, Urs Holzle and Jan Vitek, 1995, p. 252-282.
Message Exchange Patterns, retrieved from the internet at http://winfx.msdn.microsoft.com/library/default.asp?url=/library/en-us/indigo_samples/html/738705-ad3e40e0-b363-90305bddb140.asp. Retrieved Jan. 6, 2006.

* cited by examiner

*Primary Examiner*—Wei Zhen
*Assistant Examiner*—Phillip H Nguyen
(74) *Attorney, Agent, or Firm*—Workman Nydegger

(57) ABSTRACT

Mechanisms for automatically generating code that tests capabilities of a test computing system to simulate a message exchange pattern. The code generation computing system uses a message exchange pattern definition to generate the simulation code. For each state in which the message exchange pattern definition allows valid messages to be transmitted, code is generated for that state that at least simulates the transmission of a valid transmission message. For each state in which the message exchange pattern definition allows valid messages to be received, code is generated for that state that simulates the receipt of a valid receipt message. If the transmission or receipt of the message causes a state transition to occur, code is generated that causes the appropriate state transition in the message exchange pattern.

30 Claims, 4 Drawing Sheets

AUTOMATED GENERATION OF MESSAGE EXCHANGE PATTERN SIMULATION CODE

BACKGROUND OF THE INVENTION

1. The Field of the Invention

The present invention relates to networking technologies; and more specifically, to the automated generation of code that simulates a message exchange pattern.

2. Background and Related Art

Computing technology has transformed the way we work and play. Computing systems now take a wide variety of forms including desktop computers, laptop computers, tablet PCs, Personal Digital Assistants (PDAs), and the like. Even household devices (such as refrigerators, ovens, sewing machines, security systems, and the like) have varying levels of processing capability and thus may be considered computing systems.

Much of the functionality provided by computing systems relies on the computing system being networked with (and able to communicate messages with) other computing systems. In order for the two communicating computing systems to accomplish a particular task, a message transaction involving a pattern of message exchanges may be needed. Each computing system involved in the message transaction has an application (hereinafter also referred to as a "message exchange pattern application") that assists in processing messages received as part of the transaction that follows the message exchange pattern, and transmitting other messages that conform with the message exchange pattern.

In order to test a message exchange pattern application, the message exchange pattern application may be installed on different computing systems and then tested. However, in many cases, the message exchange pattern application on one computing system may be significantly different than the message exchange pattern application on another computing system, even though the two message exchange pattern applications are capable of interacting with each other using the message exchange pattern. The tester might only have access to one of the message exchange pattern applications. Furthermore, the owner of the other message exchange pattern application may not be willing or able to cooperatively test the interaction of the two message exchange pattern applications. Accordingly, it is not always feasible to test the message exchange pattern application in an actual network environment in which it will be implemented and deployed.

What would be advantageous is a mechanism for testing message exchange pattern applications without having to test the application in the actual network environment in which it would ultimately be employed. It would furthermore be advantageous if this testing may be accomplished without requiring the authoring of additional testing software each time a message exchange pattern application is to be tested.

BRIEF SUMMARY OF THE INVENTION

The foregoing problems with the prior state of the art are overcome by the principles of the present invention, which are directed towards mechanisms for automatically generating code that tests capabilities of a test computing system to simulate a message exchange pattern.

The code generation computing system uses a message exchange pattern definition to generate the simulation code. The message exchange pattern definition includes the following for each of the transition states in the message exchange pattern: 1) an indication of which computing system may transmit (and/or receive) each valid message given the state, and 2) a state transition description resulting from transmitting or receiving a valid message.

For each state in which the message exchange pattern definition allows valid messages to be transmitted, code is generated for that state that at least simulates the transmission of a valid transmission message. For each state in which the message exchange pattern definition allows valid messages to be received, code is generated for that state that at least simulates the receipt of a valid receipt message. If the transmission or receipt of the message causes a state transition to occur, code is generated that causes the appropriate state transition in the message exchange pattern. The code generation computing system may also generate code that simulates the transmission or receipt of invalid messages given a particular state as well. Probabilities may be assigned to certain message(s) (whether valid or invalid) being transmitted or received. The message exchange pattern may be simulated a number of times to simulate many or all possible state transition paths through the message exchange pattern. This enables the simulation to cover even potentially all of the possible cases that will be encountered in a real deployment.

Accordingly, the simulation code is automatically generated using the message exchange pattern definition, thereby making it easier to generate simulation code. Furthermore, the simulation may be internal to a single computing system since message transmission and receipt may be simulated without communicating with another computing system. Accordingly, there is no need to use network resources. Alternatively, even if the simulation is not internal to the single computing system, the simulation allows for communication within the network of a single organization. Accordingly, there is no need to rely on the cooperation of another organization in order to test the message exchange pattern application.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
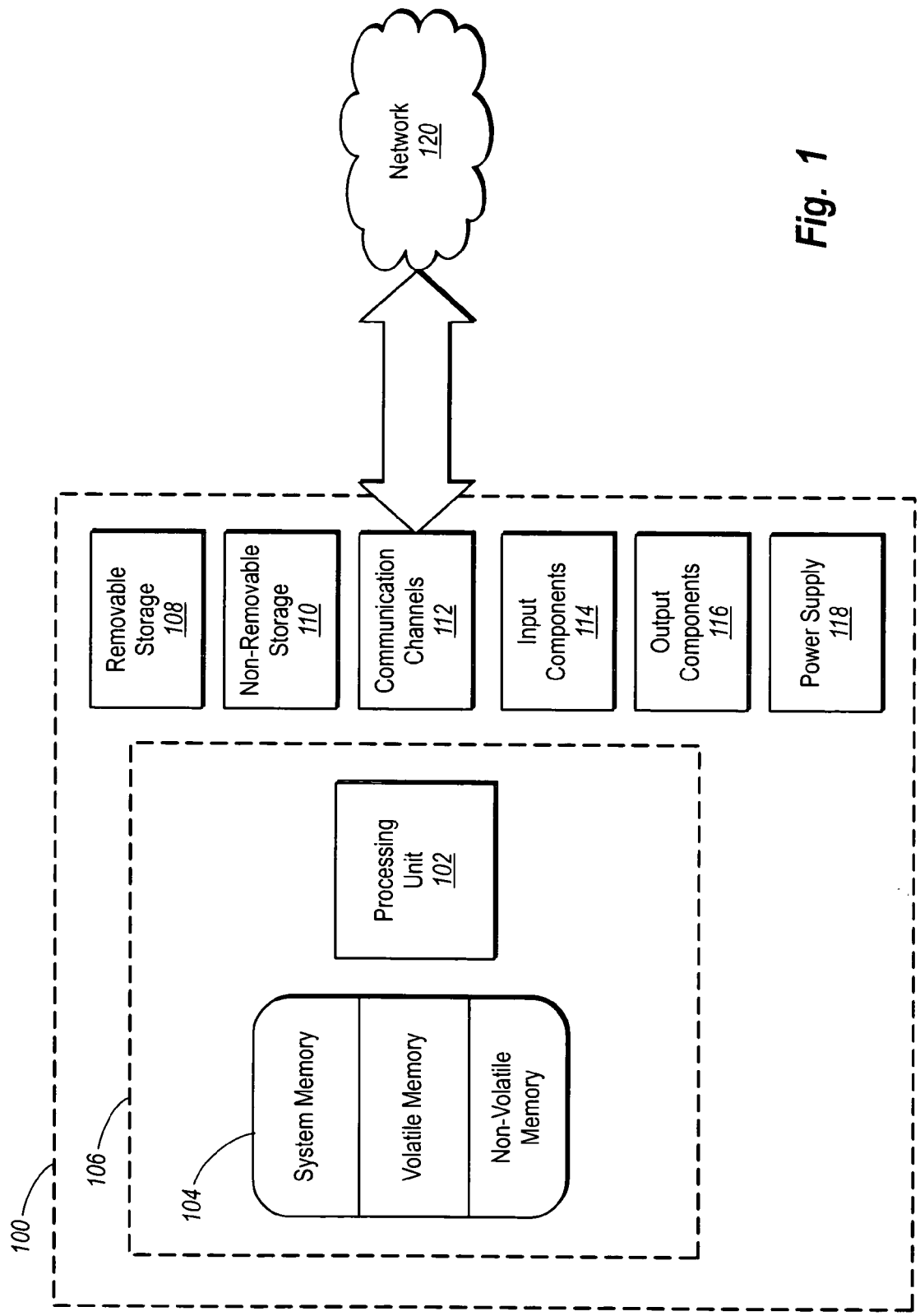
FIG. 1 illustrates a suitable computing system that may implement features of the present invention.

The principles of the present invention relate to mechanisms for automatically generating code that tests capabilities of a test computing system to simulate a message exchange pattern. The code generation computing system uses a message exchange pattern definition as a basis for automatically generating the simulation code. For each state in which the message exchange pattern definition allows valid messages to be transmitted, code is generated for that state that at least simulates the transmission of a valid transmission message. For each state in which the message exchange pattern definition allows valid messages to be received, code is generated for that state that simulates the receipt of a valid receipt message. If the transmission or receipt of the message causes a state transition to occur, code is generated that causes the appropriate state transition in the message exchange pattern.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware. FIG. 1 shows a schematic diagram of an example computer architecture usable for these devices.

For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over a network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
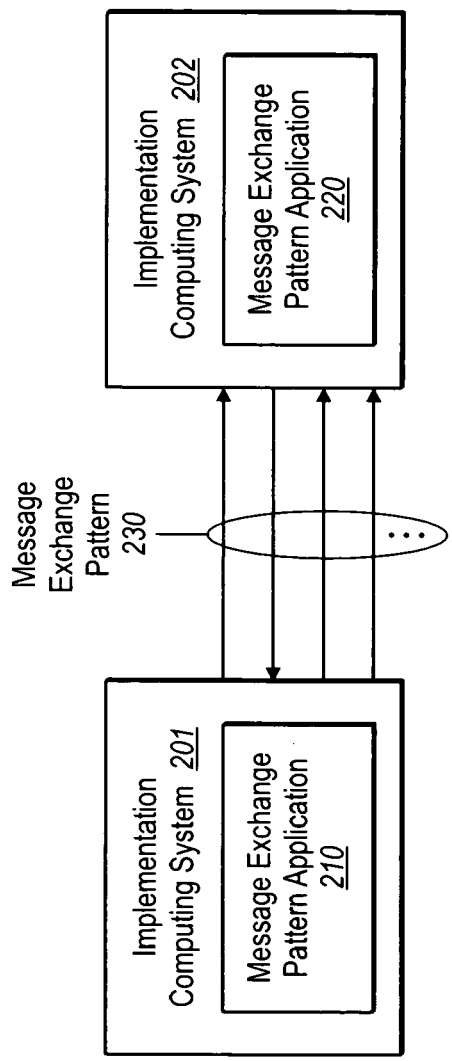
FIG. 2 illustrates a network environment in which two computing systems implement a message exchange pattern, each using a message exchange pattern application.

FIG. 2 illustrates a network environment 200 in which two computing systems (referred to as "implementation computing systems" in FIG. 2) communicate to accomplish a particular task. In particular, the implementation computing system 201 communicates with the implementation computing system 202. In order to accomplish the particular task, the computing systems 201 and 202 exchange messages in a particular pattern of exchange 230. The particular pattern of message exchange defines which computing system is to send which message at any given point in the message exchange. The message exchange pattern depends on the task to be accomplished, and the protocols used to exchange messages. The principles of the present invention are not limited to any given structure for the message exchange pattern.

Each implementation computing system has a message exchange pattern application that engages in the message exchange pattern. For example, implementation computing system 201 executes message exchange pattern application 210, while implementation computing system 202 executes message exchange pattern application 220. The implementation computing systems 201 and 202 may be structured as described above for the computing system although this is not required. In this description and in the claims, a "computing system" is defined as any device or system that has the capability to process electronic messages.

The messages within the message exchange pattern need not all be generated and consumed by the same components in the computing system. For example, some message may be protocol level messages to allow for proper coordination at the protocol-level between the two computing systems. Other messages may be application-level message to allow for the exchange of data needed to accomplish the desired task. In one embodiment, the protocol level messages in the message exchange pattern are governed by the Web Services Coordination (WS-Coordination) and WS-Transaction specifications, which are known to those of ordinary skill in the art.

FIG. 2 illustrates the environment in which the message exchange pattern applications will ultimately operate. However, it is desirable to test the message exchange pattern application to ensure proper operation prior to shipping the application. It often takes considerable time to test applications since often new code needs to be drafted in order to perform simulation. Furthermore, the testing of message exchange pattern applications is particularly difficult since the operations are by nature distributed, and often distributed across boundaries of trust. For example, those authoring the message exchange pattern application 210 may not have access to the message exchange pattern application 220 that is to run on the other computing system. Furthermore, the cooperation of the owner of the message exchange pattern application 220 may be difficult to acquire for testing purposes.

Figure 3:
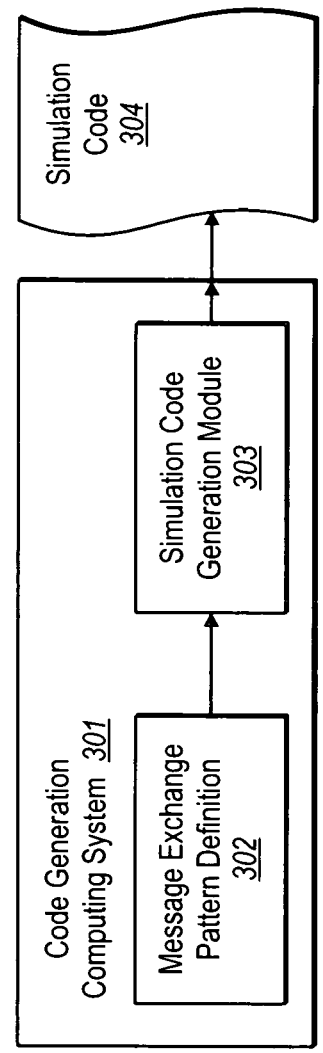
FIG. 3 illustrates a code generation computing system then automatically generates code that internally simulates a message exchange pattern on a test computing system.

Accordingly, the principles of the present invention provide a mechanism whereby code is automatically generated that allows a test computing system to simulate the conduct of a message exchange pattern without requiring extensive human authoring of code, and without requiring the testing to occur with the cooperation of another organization or even perhaps in any network environment at all. FIG. 3 illustrates an environment in which such automated code generation may occur.

Figure 4:
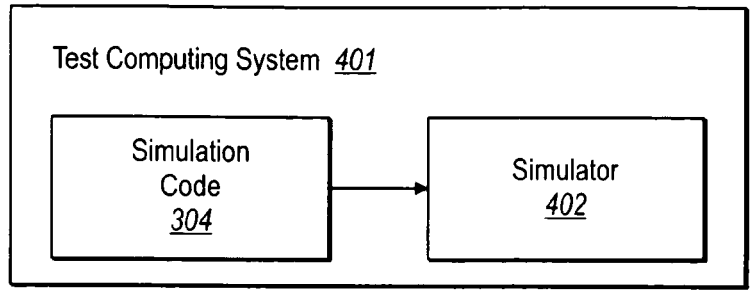
FIG. 4 illustrates a test computing system internally simulating the message exchange pattern using simulation code generated by the code generation computing system.

Referring to FIG. 3, a code generation computing system 301 accesses a message exchange pattern definition 302. A simulation code generation module 303 uses the message exchange pattern definition 303 to generate simulation code 304. Referring to FIG. 4, this simulation code 304 may then be used by a test computing system 401 by a simulator 402 to test the message exchange pattern definition. More regarding this operation will be described further below after having first described the message exchange pattern definition 303 in further detail.

In the message exchange pattern, there are a number of states. The message exchange pattern definition defines these states. For each state, there will be zero or more valid message types that may be transmitted, and zero or more valid message types that may be received. With the receipt or transmission of a valid message type, the message exchange pattern may transition to a different state. The message exchange pattern indicates the valid message types for each state, and indicates what state transitions should occur given a certain valid message type. The message exchange pattern definition may be in any format. However, in order to interpret the message exchange pattern in order to automatically generate code, it is advantageous if the message exchange pattern definition is in a format that may be more easily parsed. An example of such a format is defined by the Web Services Description Language (WSDL) standard.

The message exchange pattern definition may also include, for example, probability chances that a certain valid message will be received or transmitted given a certain state. The message exchange pattern definition may also impose timing policies that should be applied given a certain state. For example, timing policies may indicate that a previous request should be cancelled if no response is received within a certain time period.

The message exchange pattern definition may be better understood by reducing the message exchange pattern definition to a state transition tree. A state transition tree may be constructed in memory during the code generation process although this need not be the case. The message exchange pattern state transition tree includes nodes for each state in the message exchange pattern. For each node, there is provided a listing of valid message types and which computing system may send which types of messages. For each valid message type, there is also an identification of which state to transition to when receiving (or transmitting as the case may be) the specified message.

The structure of the tree depends entirely on the message exchange pattern, which in turn depends on the task to be performed. Illustrating all possible state transition trees would be impossible due to the endless variety of message exchange patterns. Listing many would obscure the principles of the present invention. However, one message exchange pattern is described here for illustrative purposes only. Those of ordinary skill in the art will appreciate (after having read this description) that the principles of the present invention apply to any message exchange pattern.

Figure 5:
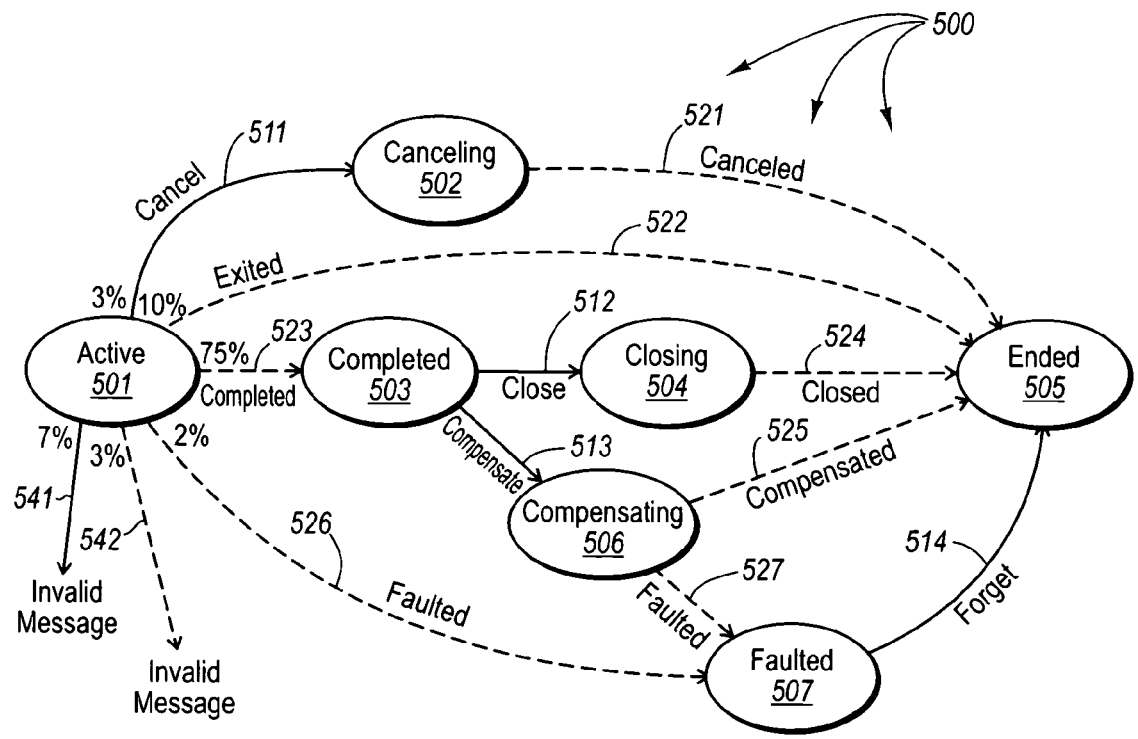
FIG. 5 illustrates a state transition tree that may be used to track progress in an arbitrary message exchange pattern.

That said, FIG. 5 illustrates an example message exchange pattern state transition tree 500. The state transition tree 500 includes a number of states 501 through 507. The transmission of messages from one of the computing systems results in state transitions represented by solid arrows. On the other hand, the transmission of messages from the other of the computing systems results in state transitions represented by dashed arrows. For now, ignore the arrows 541 and 542 as well as the percentage markings, which items will be explained further below with respect to FIG. 6. Referring to FIG. 5, one computing system transmits messages that result in state transitions 511 through 514, while the other computing system transmits messages that result in state transitions 521 through 527. Each arrow is associated with a particular message type or group of message types that are valid for that transition.

If WS-Coordination is being used, the implementation computing system 201 may first send a coordination context message to the implementation computing system 202. The implementation computing system 202 then may send a registration message to the implementation computing system 201. The implementation computing system 201 then sends a registration receipt message to the implementation computing system 202. At this stage, the implementation computing system 201 takes on the role of "coordinator" and the implementation computing system 201 takes on the role of "participant", and the message exchange is in the active state 501. The solid lines in FIG. 5 represent state transitions caused by the coordinator (i.e., the implementation computing system 201) transmitting messages, while the dashed lines in FIG. 5 represent state transitions caused by the participant (i.e., the implementation computing system 202) transmitting messages.

From the active state 501, the implementation computing system 201 may transmit a cancel message to the implementation computing system 202. This represents that the implementation computing system 201 has chosen to cancel operations previously requested, and result in a transition from the active state 501 to the canceling state 502 as represented by the solid arrow 511. More generally, the transmitting computing system recognizes state transitions as soon as the message associated with the transition is transmitted. The receiving computing system recognizes state transitions as soon as the message associated with the transition is received. Accordingly, there may be some transient differences in the tracked progress of the state transition chart as recognized by the implementation computing system 201, and the tracked progress of the state transition chart as recognized by the implementation computing system 202. In this specific transition 511, the implementation computing system 201 recognizes this transition 511 as soon as it transmits the cancel message. The implementation computing system 202 recognizes the transition 511 as soon as it receives the cancel message.

Alternatively, while in the active state 501, the implementation computing system 201 may receive an exited message from the implementation computing system 202. This informs the implementation computing system 201 that the implementation computing system 202 will no longer participate in the message exchange pattern. Accordingly, the transmission of the exited message from the implementation computing system 202 to the implementation computing system 201 results in a transition 522 from the active state 501 to an ended state 505.

Alternatively, while in the active state 501, the implementation computing system 201 may receive a completed message from the implementation computing system 202. This informs the implementation computing system 201 that the implementation computing system 202 has completed processing related to a previous request. Accordingly, the transmission of the completed message from the implementation computing system 202 to the implementation computing system 201 results in a transition 523 from the active state 501 to a completed state 503.

Alternatively, while in the active state 501, the implementation computing system 201 may receive a faulted message from the implementation computing system 202. This informs the implementation computing system 201 that the implementation computing system 202 has failed from the active state 501. Accordingly, the transmission of the faulted message from the implementation computing system 202 to the implementation computing system 201 results in a transition 526 from the active state 501 to a faulted state 507.

While in the canceling state 502, the implementation computing system 201 may receive a canceled message from the implementation computing system 202. This informs the implementation computing system 201 that the implementation computing system 202 acknowledges that the previously requested operation has been cancelled at the request of the implementation computing system 201. Accordingly, the transmission of the canceled message from the implementation computing system 202 to the implementation computing system 201 results in a transition 521 from the canceling state 502 to the ended state 505.

While in the completed state 503, the implementation computing system 201 may transmit a close message to the implementation computing system 202. This informs the implementation computing system 202 that the previous request was successful. Accordingly, the transmission of the close message from the implementation computing system 201 to the implementation computing system 202 results in a transition 512 from the completed state 503 to the closing state 504.

While in the closing state 504, the implementation computing system 201 may receive a closed message from the implementation computing system 202. This informs the implementation computing system 201 that the implementation computing system 202 has finalized the operation successfully. Accordingly, the transmission of the closed message from the implementation computing system 202 to the implementation computing system 201 results in a transition 524 from the closing state 504 to the ended state 505.

Also while in the completed state 503, the implementation computing system 201 may transmit a compensate message to the implementation computing system 202. This informs the implementation computing system 202 that the work being done should be undone to the extent reasonable. Accordingly, the transmission of the compensate message from the implementation computing system 201 to the implementation computing system 202 results in a transition 513 from the completed state 503 to the compensating state 506

While in the compensating state 506, the implementation computing system 201 may receive a compensated message from the implementation computing system 202. This informs the implementation computing system 202 that the compensation action was successful. Accordingly, the transmission of the compensated message from the implementation computing system 202 to the implementation computing system 201 results in a transition 525 from the compensating state 506 to the ended state 505.

Alternatively, while in the compensating state 506, the implementation computing system 201 may receive a faulted message from the implementation computing system 202. This informs the implementation computing system 201 that the implementation computing system 202 has failed from the compensating state 506. Accordingly, the transmission of the faulted message from the implementation computing system 202 to the implementation computing system 201 results in a transition 527 from the compensating state 506 to a faulted state 507.

While in the faulted state 507, the implementation computing system 201 may transmit a forget message to the implementation computing system 202. This informs the implementation computing system 202 that the implementation computing system 201 is aware of the fault. Accordingly, the transmission of the forget message from the implementation computing system 201 to the implementation computing system 202 results in a transition 514 from the faulted state 507 to the ended state 505.

Figure 6:
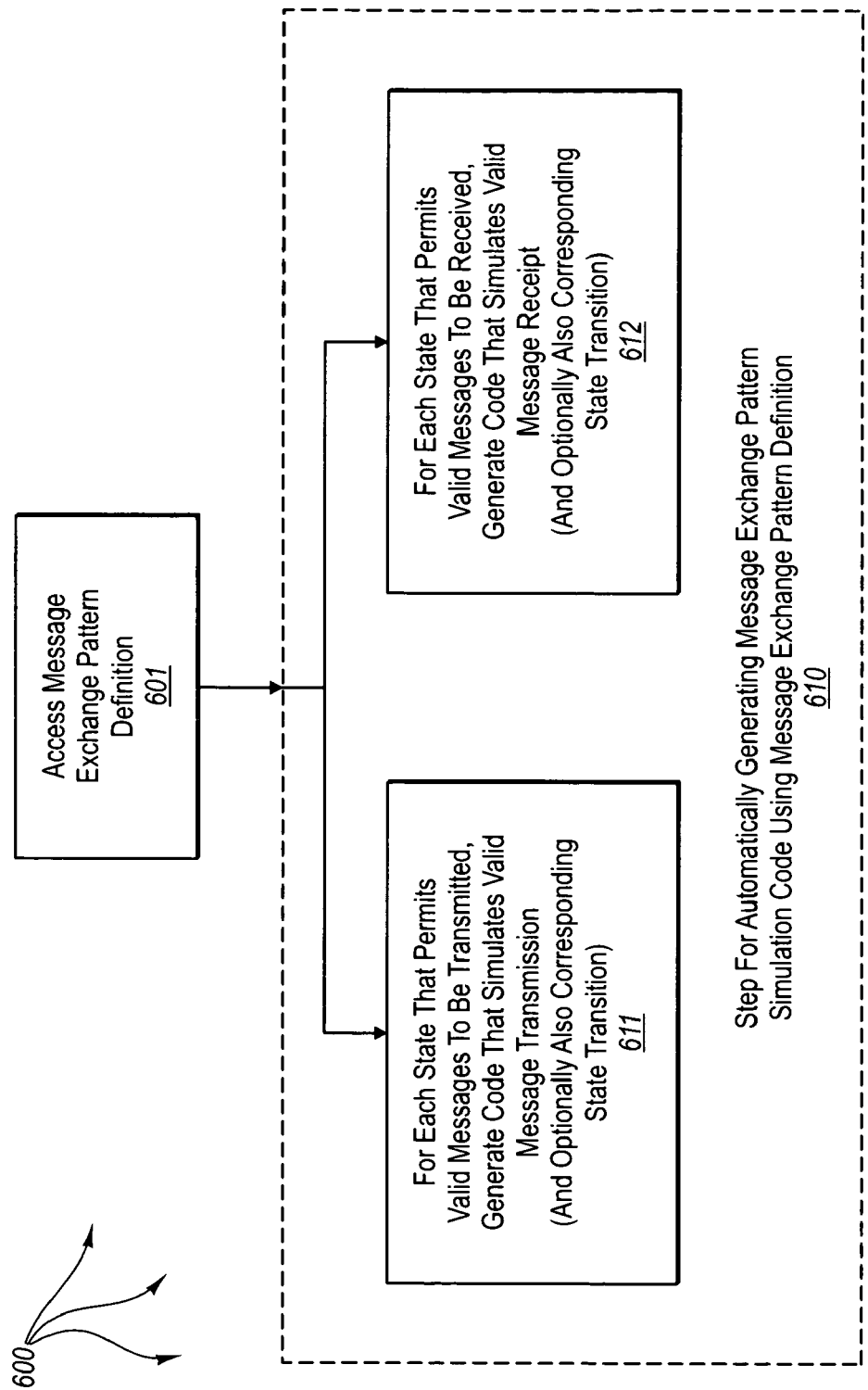
FIG. 6 illustrates a flowchart of a method for the code generation computing system to automatically generate simulation code that internally simulates a message exchange pattern.

FIG. 6 illustrates a flowchart of a method 600 for the code generation computing system 301 to automatically generate code that tests capabilities of the test computing system 401 to use a message exchange pattern application to engage in message transactions following a message exchange pattern. The code permits the simulation without requiring that the test computing system 401 engage in the message transaction with other organizations, or even in some cases without requiring communication with other computing systems. The method 600 will be described with frequent reference to the specific example message exchange pattern definition of FIG. 5.

The code generation computing system accesses a message exchange pattern definition (act 601) such as the message exchange pattern definition described above. The code generation computing system then performs a functional, result-oriented step for automatically generating message exchange pattern simulation code using the message exchange pattern definition (step 610). The step 610 may include any corresponding specific acts that accomplish this result. However, in the illustrated embodiment, the step 610 includes corresponding acts 611 and 612.

Specifically, for each state in which the message exchange pattern definition allows a valid transmission message to be transmitted by the test computing system, the code generation computing system automatically generates code that at least simulates transmission of the valid transmission message (act 611). For example, consider the active state 501 of FIG. 5. The active state 501 permits one valid message to be transmitted, a Cancel message. There is indicated to be a 3% chance that the cancel message will be transmitted. This percentage may be specified by the message exchange pattern definition and/or may be specified by the user or the code generation computing system. The percentage associated with this transmission may dynamically change over time during the testing process. To simulate the conditional transmission of the Cancel message, the code generation computing system may generate code that follows the following pseudo-code document with line number added for ease of later explanation.

```
1.  main
2.  {
3.      Do State501( )
4.      {
5.      Flip a Coin
6.      if Coin is in 3% range
7.          Send(Cancel)
8.          Go to DoState502
9.      end if
10.     }
11.     .
12.     .
13.     .
14. }
```

In this pseudo-code, a main program is created with its title at line 1, its opening bracket at line 2, and its closing bracket at line 14. Then, a subroutine is generated called DoState 501. Line 3 identifies the subroutine which is bracketed using an open bracket at line 4 and a closing bracket at line 10. Code is then generated to generate a pseudo-random value (see line 5). Conditional code is then generated so that if appropriate given that random value (see line 6), the transmission of the cancel message is at least simulated (see line 7), and code is generated to advance execution to the next state (see line 8) to thereby transition to the next appropriate state.

Returning back to FIG. 6, for each state in which the message exchange pattern definition allows a valid receipt message to be received, the code generation computing system generates code that simulates the receipt of the valid receipt message, and that transitions to other code that represents the state to transition. For example, the active state 501 permits the receipt of three valid messages; an Exited message having a 10% chance of occurrence, a Completed message having a 75% chance of occurrence, and a Faulted message having a 2% change of occurrence. This is simulated in the example pseudo-code by adding additional conditional statements in the same DoState 501 subroutine as follows:

```
1.  main
2.  {
3.      Do State501( )
4.      {
5.      Flip a Coin
6.      if Coin is in the appropriate 3% range
7.          Send(Cancel)
8.          Go to DoState502
9.      end if
10.     if Coin is in the appropriate 10% range
11.         Receive(Exited)
12.         Go to DoState505
13.     end if
14.     if Coin is in the appropriate 75% range
15.         Receive(Completed)
16.         Go to DoState503
17.     end if
18.     if Coin is in the appropriate 2% range
19.         Receive(Faulted)
20.         Go to DoState507
21.     end if
22.     }
23.     .
24.     .
25.     .
26. }
```

Note the addition of the conditionally executed pseudo-code for simulating receipt of the Exited message with appropriate state transition to state 505 (see lines 10-13), simulating receipt of the Completed message with appropriate state transition to state 503 (see lines 14-17), and simulating receipt of the Faulted message with appropriate state transition to state 507 (see lines 18-21).

In addition, the transmission or receipt of invalid messages may be simulated by assigning a positive probability of occurrence to the transmission or receipt or certain invalid messages. These invalid messages may not be specified by the message exchange pattern definition because they do not follow the message exchange pattern. Instead, they may be entered by a user or by the code generation computing system. For instance, while in the active state 501, an invalid message may be transmitted as indicated by arrow 541 (having a 7% chance of occurrence). Also, an invalid message may be received as indicated by arrow 542 (having a 3% chance of occurrence). Simulating the receipt and transmission of invalid message allows the simulation to test the very real possibility of having to deal with non-conformity to the message exchange pattern. Similar code may be automatically generated for these invalid messages as well. For example, the following pseudo-code extends the previous example to generate code that conditionally simulates the transmission (see lines 25-27) and receipt (see lines 22-24) of invalid messages.

```
1.   main
2.   {
3.       DoState501( )
4.       {
5.           Flip a Coin
6.           if Coin is in the appropriate 3% range
7.               Send(Cancel)
8.               Go to DoState502
9.           end if
10.          if Coin is in the appropriate 10% range
11.              Receive(Exited)
12.              Go to DoState505
13.          end if
14.          if Coin is in the appropriate 75% range
15.              Receive(Completed)
16.              Go to DoState503
17.          end if
18.          if Coin is in the appropriate 2% range
19.              Receive(Faulted)
20.              Go to DoState507
21.          end if
22.          if Coin is in the appropriate 3% range
23.              Receive(Invalid Message)
24.          end if
25.          if Coin is in the appropriate 7% range
26.              Send(Invalid Message)
27.          end if
28.      }
29.      .
30.      .
31.      .
32.  }
```

This generation process may be also performed to generate subroutines for the other states as well (e.g., states 502 through 507), which may also have their own branching probabilities. The code generation process involves generating a primary program (e.g., the program "main"), generating a subroutine for each state, generating a random number for each state in which multiple events may occur, and then conditionally performing the event based on the random number. As this is a highly procedural process, involving little in the way of judgment calls, the code generation process may be highly automated. Any user intervention, if any, would be trivial. For example, the user may need to estimate probabilities of occurrence for each valid message type, and indicate whether or not invalid message receipt or transmission may occur (along with associated probabilities). However, the user would not actually need to draft the code itself. Accordingly, code is more easily generated.

Furthermore, the "send" and "receive" functions may be authored to merely simulate the transmission and receipt of messages as they would occur during actual deployment. Accordingly, there is no need to rely on the cooperation of the other organization that will ultimately be involved with the message exchange pattern in order to test the message exchange pattern application. In one embodiment, the transmission and reception itself may be simulated such that the simulation results in no actual network traffic, thereby preserving network resources.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a code generation computing system that includes one or more processors to execute computer-executable instructions in system memory, a method for automatically generating executable code configured to simulate a message exchange pattern, the method comprising the following:

an act of accessing a message exchange pattern definition for the message exchange pattern, the message exchange pattern definition defining which of a first message exchange pattern application and a second message exchange pattern application are to send which message at any given point in the message exchange pattern;

a plurality of states of the message exchange pattern;

one or more state transitions between the plurality of states; and for each of the plurality of states:

valid message types for the state;

one or more valid message types that may be transmitted when the message exchange pattern is in the state;

one or more valid message types that may be received when the message exchange pattern is in the state; and an indication of which state transitions should occur given a certain valid message type;

an act of automatically generating executable message exchange pattern simulation code, based on the message exchange pattern definition, for simulating the state transitions of the message exchange pattern, the generated executable message exchange pattern simulation code representing a stand alone computer program that can be executed at a computer system to test the message exchange pattern definition without communicating with any message exchange pattern applications, including:

for each of the plurality of states that permits valid messages to be transmitted:

automatically generating executable code to simulate transmission of a valid message between the first message exchange pattern application and second message exchange pattern application; and automatically generating executable code to simulate a corresponding state transition in response to the simulated transmission of the valid transmission message; and for each of the plurality of states that permits valid messages to be received:

automatically generating executable code to simulate reception of a valid message between the first message exchange pattern application and second message exchange pattern application; and automatically generating executable code to simulate a corresponding state transition in response to the simulated reception of the valid message.

2. A method in accordance with claim 1, wherein the message exchange pattern definition indicates that when in a particular state, any one of a plurality of valid transmission messages may be transmitted.

3. A method in accordance with claim 2, wherein the message exchange pattern definition indicates for each of the plurality of valid transmission messages for the particular state, a percentage chance that each of the plurality of valid transmission messages will be transmitted given the particular state, wherein the method further comprises automatically generating code to at least simulate each of the plurality of valid transmission messages and performing appropriate state transitions given the transmission.

4. A method in accordance with claim 3, further comprising the following:
an act of generating code that generates a pseudo-random value and selects one of the plurality of valid transmission messages to transmit based on the pseudo-random value and on the percentage chance.

5. A method in accordance with claim 1, further comprising the following for at least one state:
an act of generating code that at least simulates transmission of an invalid transmission message.

6. A method in accordance with claim 5, wherein there is also indicated a percentage chance that the invalid transmission messages will be transmitted given the particular state, wherein the method further comprises an act of generating code that generates a pseudo-random value and selects one of the invalid transmission message to transmit based on the pseudo-random value and on the percentage chance.

7. A method in accordance with claim 1, wherein the message exchange pattern definition indicates that when in a particular state, any one of a plurality of valid receipt messages may be received.

8. A method in accordance with claim 7, wherein the message exchange pattern definition indicates for each of the plurality of valid receipt messages for the particular state, a percentage chance that each of the plurality of valid receipt messages will be received given the particular state, wherein the method further comprises automatically generating code to simulate each of the plurality of valid receipt messages and performing appropriate state transitions given the transmission.

9. A method in accordance with claim 8, further comprising the following:
an act of generating code that generates a pseudo-random value and selects one of the plurality of valid receipt messages to function as a simulated receipt based on the pseudo-random value and on the percentage chance.

10. A method in accordance with claim 1, further comprising the following for at least one state:
an act of generating code that simulates receipt of an invalid transmission message.

11. A method in accordance with claim 10, wherein there is also indicated a percentage chance that the invalid receipt message will be received given the particular state, wherein the method further comprises an act of generating code that generates a pseudo-random value and selects one of the invalid received message to function as a simulated receipt based on the pseudo-random value and on the percentage chance.

12. A method in accordance with claim 1, wherein the message exchange pattern definition is defined using the Web Services Description Language (WSDL) standard.

13. A method in accordance with claim 1, wherein the message exchange pattern definition further defines timing policies to be imposed when in a particular state.

14. A computer program product for use in a code generation computing system that includes one or more processors to execute computer-executable instructions in system memory, the computer program product for performing a method for automatically generating executable code configured to simulate a message exchange pattern, the computer program product comprising one of more computer-storage media that, when executed by one or more processors of the code generation computing system, causes the code generation computing system to perform the method, the method comprising the following:
an act of accessing a message exchange pattern definition for the message exchange pattern, the message exchange pattern definition defining:
which of a first message exchange pattern application and a second message exchange pattern application are to send which message at any given point in the message exchange pattern;
a plurality of states of the message exchange pattern;
one or more state transitions between the plurality of states; and
for each of the plurality of states:
valid message types for the states;
one or more valid message types that may be transmitted when the message exchange patter is in the state;
one or more valid message types that may be received when the message exchange pattern is in the state; and
an indication of which state transitions should occur given a certain valid message type;
an act of automatically generating executable message exchange pattern simulation code, based on the message exchange pattern definition, for simulating the state transitions of the message exchange pattern, the generated executable message exchange pattern simulation code representing a stand alone computer program that can be executed a computer system to test the message exchange pattern definition without communicating with any message pattern exchange pattern applications, including:
for each of the plurality of states that permits valid messages to be transmitted:
automatically generating executable code to simulate transmission a valid message between the first message exchange pattern application and second message exchange pattern application; and
automatically generating executable code to simulate a corresponding state transition in response to the simulated transmission of the valid transmission message; and
for each of the plurality of states that permits valid messages to be received:
automatically generating executable code to simulate reception of a valid message between the first message exchange pattern application and second message exchange pattern application; and
automatically generating executable code to simulate a corresponding state transition in response to the simulated reception of the valid message.

15. A computer program product in accordance with claim 14, wherein the message exchange pattern definition indicates that when in a particular state, any one of a plurality of valid transmission messages may be transmitted.

16. A computer program product in accordance with claim 15, wherein the message exchange pattern definition indicates for each of the plurality of valid transmission messages for the particular state, a percentage chance that each of the plurality of valid transmission messages will be transmitted given the particular state, wherein the method further comprises automatically generating code to at least simulate each of the plurality of valid transmission messages and performing appropriate state transitions given the transmission.

17. A computer program product in accordance with claim 16, further comprising the following:
   an act of generating code that generates a pseudo-random value and selects one of the plurality of valid transmission messages to transmit based on the pseudo-random value and on the percentage chance.

18. A computer program product in accordance with claim 14, further comprising the following for at least one state:
   an act of generating code that at least simulates transmission of an invalid transmission message.

19. A computer program product in accordance with claim 18, wherein there is also indicated a percentage chance that the invalid transmission messages will be transmitted given the particular state, wherein the method further comprises an act of generating code that generates a pseudo-random value and selects one of the invalid transmission message to transmit based on the pseudo-random value and on the percentage chance.

20. A computer program product in accordance with claim 14, wherein the message exchange pattern definition indicates that when in a particular state, any one of a plurality of valid receipt messages may be received.

21. A computer program product in accordance with claim 20, wherein the message exchange pattern definition indicates for each of the plurality of valid receipt messages for the particular state, a percentage chance that each of the plurality of valid receipt messages will be received given the particular state, wherein the method further comprises automatically generating code to simulate each of the plurality of valid receipt messages and performing appropriate state transitions given the transmission.

22. A computer program product in accordance with claim 21, further comprising the following:
   an act of generating code that generates a pseudo-random value and selects one of the plurality of valid receipt messages to function as a simulated receipt based on the pseudo-random value and on the percentage chance.

23. A computer program product in accordance with claim 14, further comprising the following for at least one state:
   an act of generating code that simulates receipt of an invalid transmission message.

24. A computer program product in accordance with claim 23, wherein there is also indicated a percentage chance that the invalid receipt message will be received given the particular state, wherein the method further comprises an act of generating code that generates a pseudo-random value and selects one of the invalid received message to function as a simulated receipt based on the pseudo-random value and on the percentage chance.

25. A computer program product in accordance with claim 14, wherein the message exchange pattern definition is defined using the Web Services Description Language (WSDL) standard.

26. A computer program product in accordance with claim 14, wherein the message exchange pattern definition further defines timing policies to be imposed when in a particular state.

27. A computer program product in accordance with claim 14, wherein the one or more computer-readable media are physical media.

28. A computer program product in accordance with claim 27, wherein the one or more computer-readable media includes system memory.

29. A computer program product in accordance with claim 27, wherein the one or more computer-readable media includes persistent memory.

30. A computer program product in accordance with claim 29, wherein the persistent memory is a magnetic disk.

* * * * *